May 19, 1970
F. W. ZILL
3,512,407
ACOUSTIC AND RADIOACTIVITY LOGGING METHOD AND APPARATUS
Filed Aug. 8, 1961
5 Sheets-Sheet 1
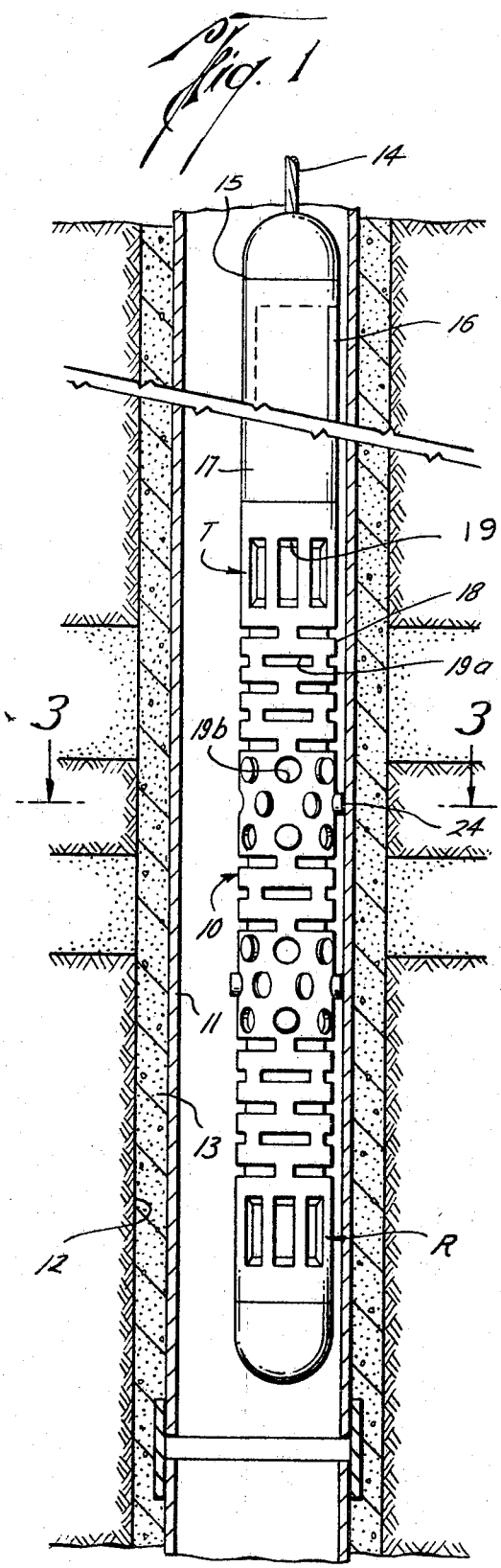
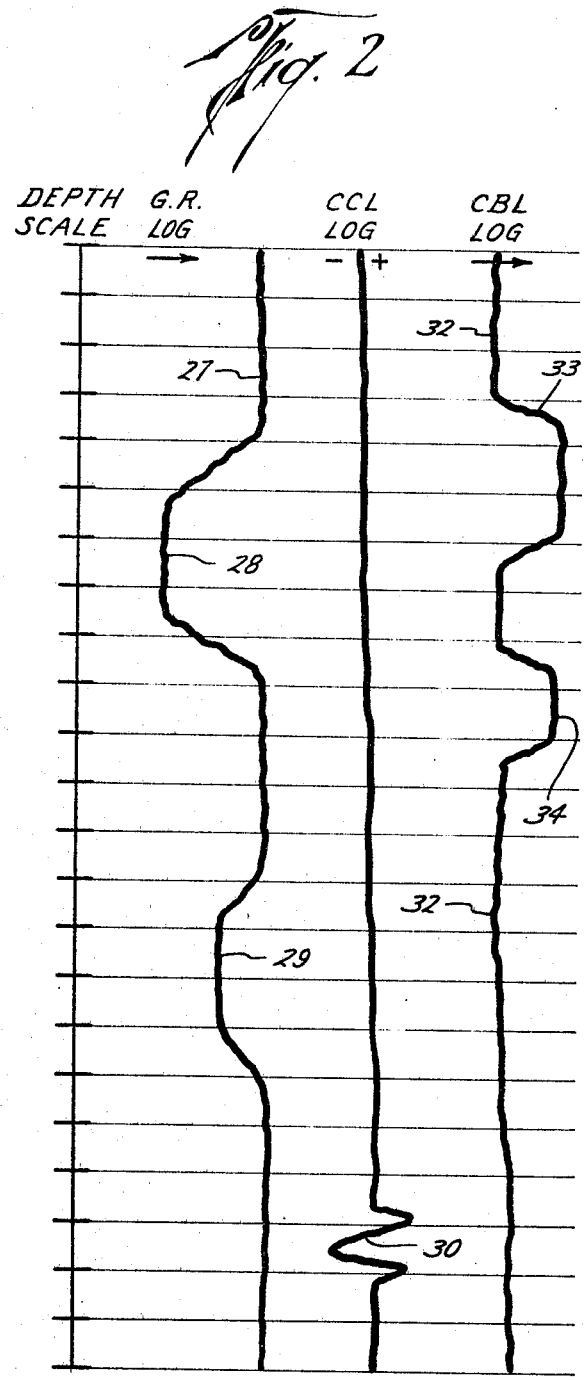
Fred W. Zill
INVENTOR.
BY Donald H. Fidler
ATTORNEY

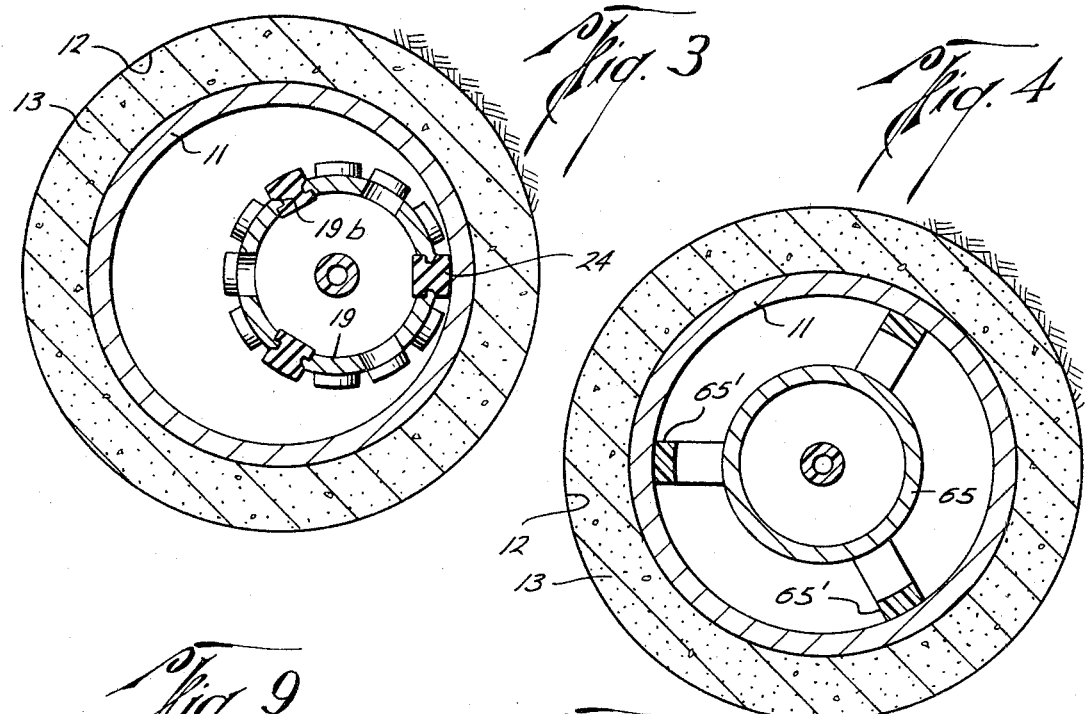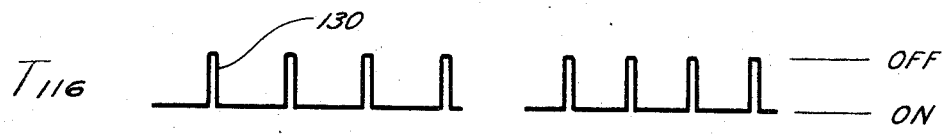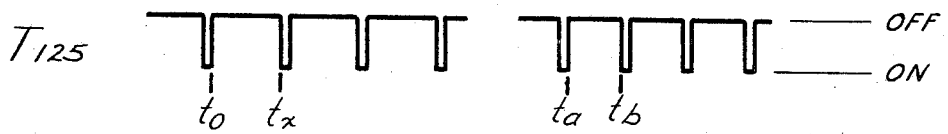

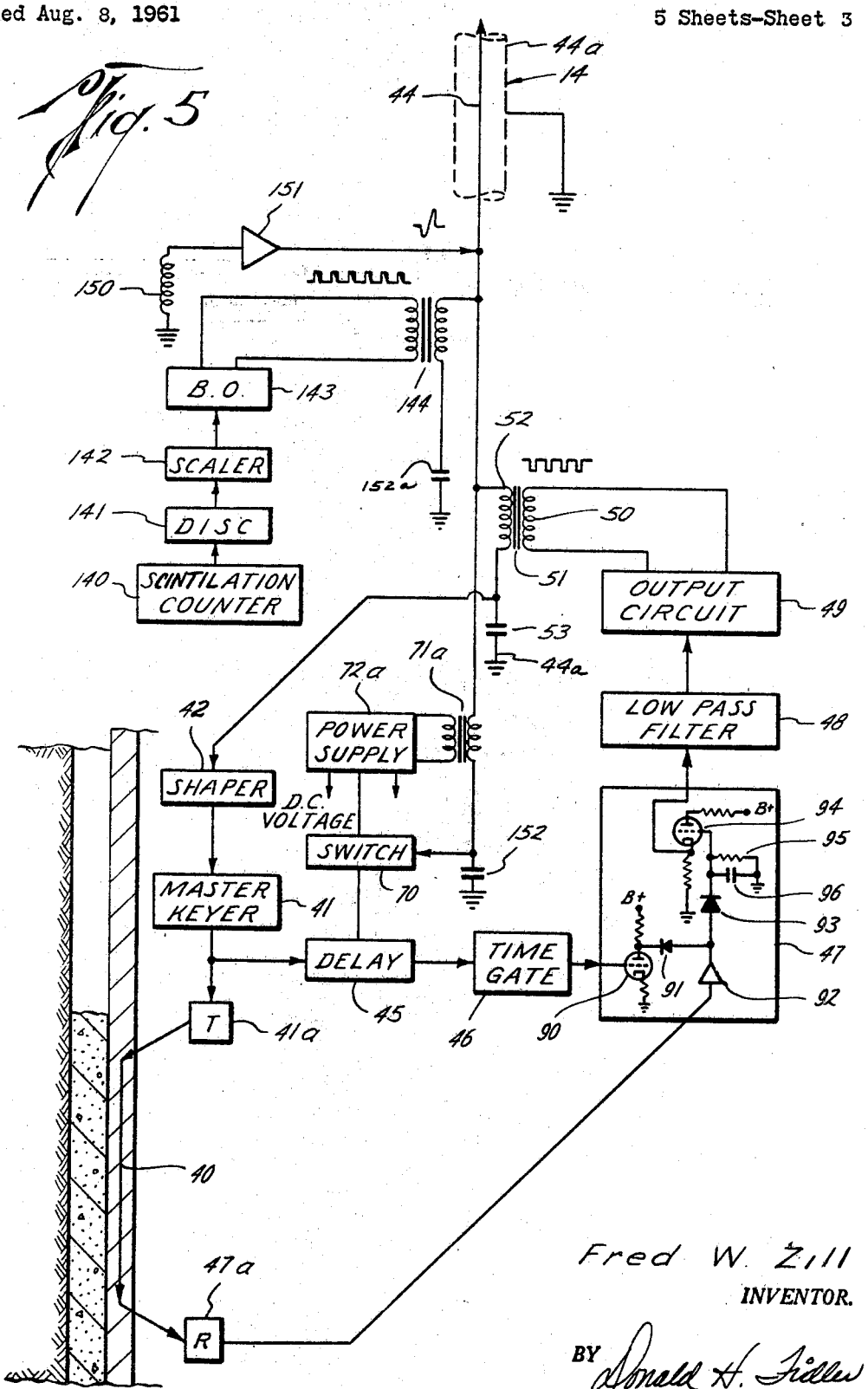

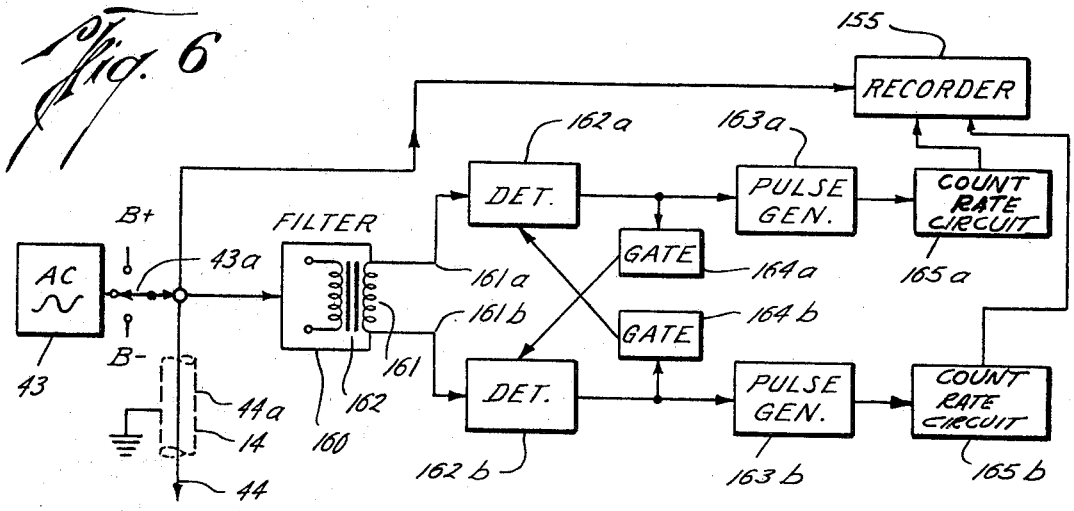
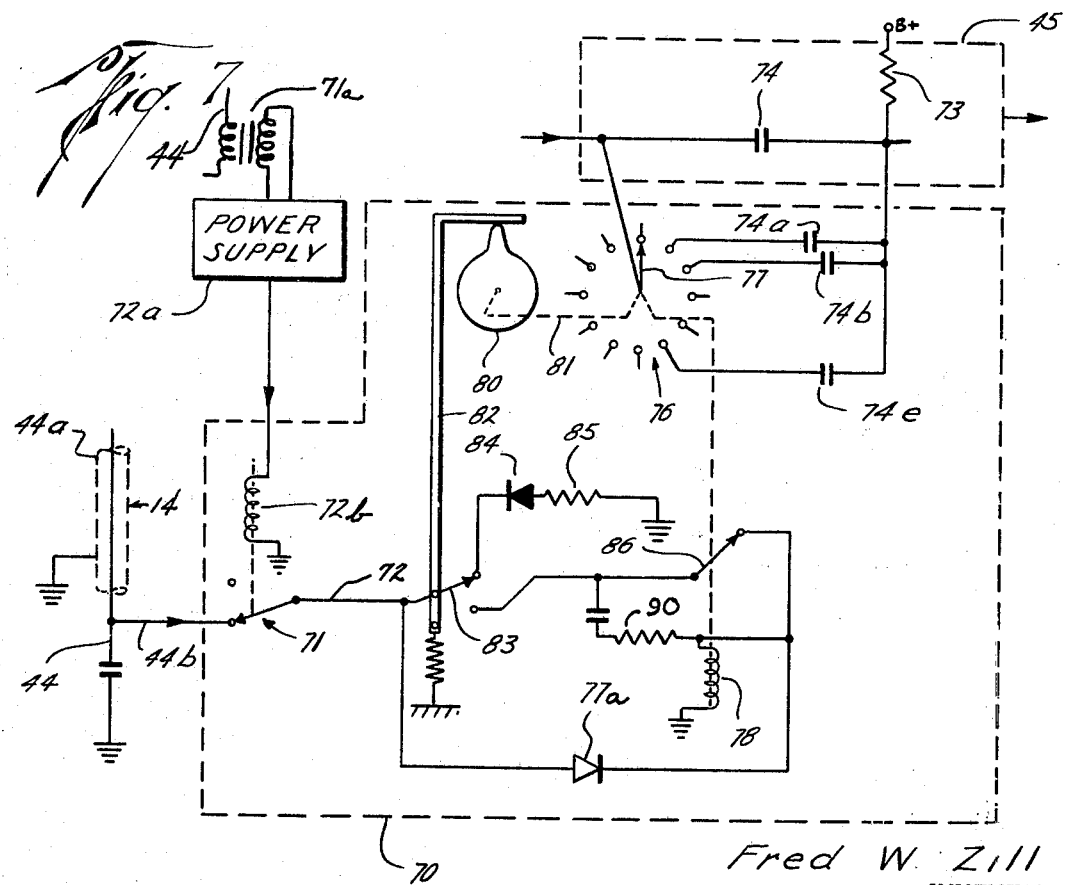

Fred W. Zill
INVENTOR.
BY Donald H. Fidler
ATTORNEY

United States Patent Office 3,512,407
Patented May 19, 1970

3,512,407
ACOUSTIC AND RADIOACTIVITY LOGGING
METHOD AND APPARATUS
Fred W. Zill, Houston, Tex., assignor, by mesne assignments, to Schlumberger Technology Corporation, Houston, Tex., a corporation of Texas
Filed Aug. 8, 1961, Ser. No. 130,116
Int. Cl. E21b 49/00; G08c 15/10
U.S. Cl. 73—152
18 Claims This invention relates to exploratory tools for use in well bores and more particularly to tools and systems useful for determining the quality of bonding between a casing and an outer sheath of cement, the location of casing collars, and types of earth formations behind a casing.

In well completion practices, after the selection of a likely production zone, a casing or string of pipe is inserted in the well bore; and cement is pumped into the annulus between the casing and borehole. The cement, upon setting, serves to plug the annular space between the pipe and the borehole to prevent migration of fluids. It is desirable to ascertain after the cementing operation whether the column of cement has adequately plugged the annular space or whether portions of cement failed to completely surround the casing or failed to bond properly to the exterior of the casing. It is also desirable to locate casing collars and the type of formations behind a casing.

In another typical oil field practice, where a recovery operation for a "stuck" drill pipe is contemplated, it is important to know the depth at which the earth formations have seized the pipe. In many instances the packing of the earth formations about the pipe is acoustically analogous to the conditions of a cement bonded pipe in that an acoustic signal is attenuated by the earth formations which are packed about the casing.

Accordingly, it is an object of the present invention to provide new and improved apparatus for logging the quality of cementation in a cased well bore.

It is an object of the present invention to provide new and improved apparatus for ascertaining acoustically the packing of earth formations about a pipe string.

A still further object of the present invention is to provide new and improved apparatus for use on a monocable for logging the quality of cementation in a cased well bore.

A still further object of the present invention is to provide new and improved circuit systems useful in the operation of a well tool suspended in a well bore by means of a monocable.

Another object of the present invention is to provide new and improved circuit systems.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawing in which:

FIG. 1 illustrates a section of the earth formations traversed by a cased well bore in which a tool embodying the present invention is disposed.

FIG. 2 illustrates schematically a log presentation of typical measurements obtained by use of the apparatus embodying the present invention.

FIG. 3 is a view in cross section taken along line 3—3 of FIG. 1.

FIG. 4 is a view in cross section through a section of the earth formations traversed by earth bore and briefly illustrating in cross section a modified arrangement for the tool illustrated in FIG. 1.

FIG. 5 is a schematic illustration of the electrical circuitry in the down hole portion of the apparatus of the present invention.

Figure 8:
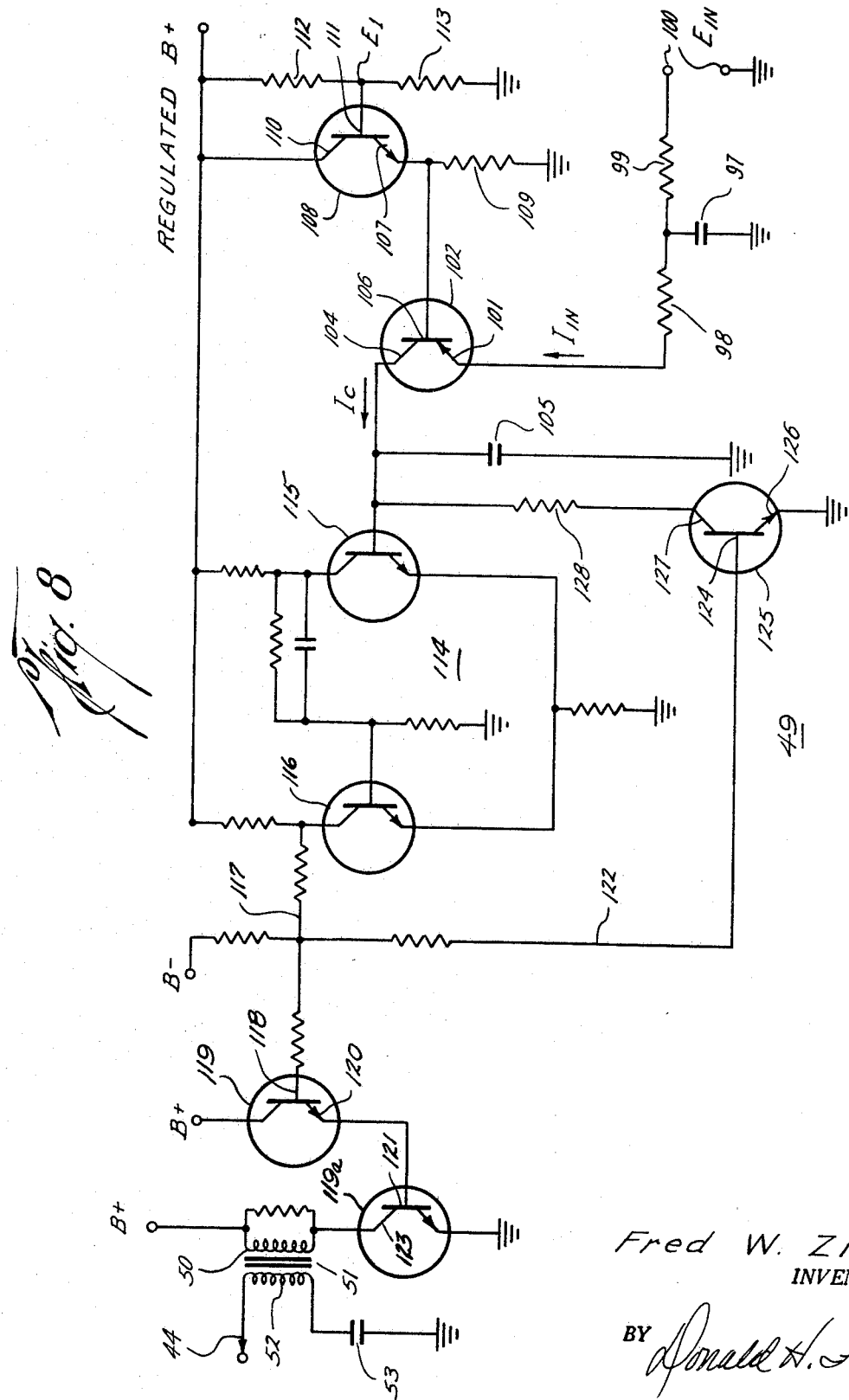

FIG. is a schematic representation of the electrical circuitry at the earth's surface which is coupled to the down hole apparatus for obtaining the log illustrated in FIG. 2.

FIG. 7 is a more detailed circuit illustration of a circuit element schematically illustrated in FIG. 5.

FIG. 8 is a more detailed circuit illustration of a circuit element schematically illustrated in FIG. 5.

FIG. 9 depicts typical electrical wave forms occurring at various points in the circuit illustrated in FIG. 8 for a given input signal.

FIG. 10 depicts typical electrical wave forms occurring at various points in the circuit illustrated in FIG. 8 for another input signal.

Referring now to FIG. 1, an apparatus 10 is shown disposed within a casing 11, the casing being firmly coupled to the borehole 12 by means of a column of cement 13. The apparatus 10 is adapted to be suspended in the well bore and passed therethrough by means of a monocable 14 and a conventional winch or pulley (not shown) situated at the surface of the earth. Apparatus 10 is shown positioned to one side of the casing 11 since, in ordinary practice, the casing and/or well bores invariably are inclined relative to a vertical so that the apparatus naturally gravitates to a lowermost side of a well bore.

The apparatus 10 includes an upper housing section 15 containing a magnet 16 which has longitudinally extending north and south poles arranged parallel to one another and suitably spaced from one another to provide magnetic attraction of the upper end of the housing relative to the casing. The magnet 16 thus offsets resultant forces on the cable which may exist at the upper end of the housing thereby to maintain the upper end of the housing from tilting relative to the casing. Below the upper housing section 15 is an electronic cartridge assembly or housing section 17 which may include a conventional casing collar locator means (not shown) and a conventional radioactivity detector device or means for detecting naturally occurring radioactivity such as gamma rays.

Below the section 17 is the acoustic section 18 which, for example, may be a tubular, rigid housing constructed of steel. A transmitter section T and a receiver section R are spaced from one another along the length of housing section 18, and the interval of housing between the transmitter T and receiver R sections is suitably perforated in a manner calculated to interrupt lengthwise extending acoustic paths thereby to alter the apparent velocity of acoustic energy along the housing 18 between the transmitter and receiver sections. The transmitter T and receiver R sections may, for example, include longitudinally extending slots 19 equidistantly spaced from one another about the periphery of the member 18; and suitable acoustic transducers (not shown), such as magnetostrictive transducers may be suitably secured relative to the transmitter T and receiver R sections.

The perforations along the length of housing member 18, for example, may include transverse, generally rectangular slots 19a which are staggered or offset relative to one another lengthwise of the housing so that a straightline acoustic path lengthwise of the housing is substantially interrupted. The perforations may also include circular shaped openings 19b which are illustrated in FIG. 1 in an intermediate position between the transmitter T and receiver R sections. Openings 19b are symmetrically disposed relative to the length of the housing to receive suitable spacing or stand off plugs 24 which provide a means of spacing the entire assembly a given distance from the wall to the casing. As shown in FIG. 3, the spacing or stand off plugs 24 may be rubber, grommet-like members which are received in openings 19b about the circumference of the housing to provide an overall peripheral coverage to space the housing a given distance from the casing regardless of its relative angular position in the casing.

The function of the tool as thus far briefly described is to obtain, at the surface of the earth, recordings of various measurements plotted against depth. The recordings may be more specifically identified as a Gamma Ray Log (GRL), a Casing Collar Log (CCL), and a Cement Bond Log (CBL).

By Cement Bond Log it is meant that acoustic energy transmitted between an acoustic transmitter and receiver in a cased well bore is measured in a certain manner to provide measurements for obtaining a recorded indiction of the quality of cementation. The CBL, as shown in FIG. 2, typically provides a base line indication 32 where the cement is suitably bonded to casing, and where bonding is not present, the signal deviates from the base line 32 to produce typical indications or excursions 33 and 34. The relative intensity of an excursion 33 or 34 is believed to be indicative of the relative quality of cementation, i.e., the greater the excursion the less likelihood of bonding, or effectiveness of cementation, or the presence of cement.

As shown in FIG. 2, a typical Gamma Ray Log is a plot of the intensity of radioactivity in the earth formations and the base line 27 of the log would normally indicate the shale zones since shale generally emits more gamma radiation than other type of formations. Excursions 28 and 29 of the Gamma Ray Log suggest formations other than shale and may be correlated with the logs of the formations made prior to the casing of the well bore.

The Casing Collar Log provides suitable indications of the location of the casing collars along the length of the casing. As typically shown in FIG. 2, an indication 30 would denote the presence of a collar in the casing string at the depth of the indication.

Referring now particularly to FIG. 5, the travel path 40 of acoustic energy between the Transmitter and Receiver is illustrated in a simplified form in terms of a ray of energy which travels through the well fluid to the casing, along the casing and returns to the receiver. The intensity of the wave front for the acoustic energy traveling path 40 is dependent upon the degree of coupling of the casing to the material surrounding the casing and the characteristics of the material itself.

In FIGS. 5 and 6 the system for deriving the above-described logs include a surface source or power supply 43 of alternating current which is connected to an insulated monocable conductor 44 wherein the metal sheath 44a of the cable 14 forms a ground return. A switch 43a is inserted between the power supply 43 and conductor 44 to disconnect the supply 43 from conductor 44 and also to permit the selective connection of either a positive (B+) or negative (B—) source of direct current (D.C.) to the cable conductor 44. In the position of the switch 43a as illustrated, alternating current (A.C.) is supplied via cable conductor 44 to a conventional shaper circuit 42 in the borehole apparatus (FIG. 5). The secondary winding 52 of the transformer 51 interposed between conductor 44 and the shaper circuit 42 does not affect the application of the A.C. signals to the shaper circuit 42 which is arranged to emit pulses to synchronize the master keyer 41 with the A.C. supply. The master keyer 41, which is a conventional multivibrator of free running type synchronized by pulses from the shaper, triggers the transmitter means 41a. The transmitter means 41a is arranged in a conventional manner to produce an acoustic impulse in response to the trigger from the keyer circuit 41 which impulse subsequently arrives at the receiver means 47a.

The electrical signal or trigger signal from the master keyer 41 which operates the transmitter means 41a also triggers a conventional delay circuit 45 which, after a predetermined time, actuates a conventional time gate circuit 46. The time gate circuit 46, in turn, controls an amplitude sensitive circuit 47 for a preselected time period so that an electrical output signal is developed which is representative of the peak amplitude of signal appearing at the input of the amplitude circuit 47 during the preselected time period. The amplitude circuit 47 is coupled between the receiver means 47a and a low pass filter 48 which serves to perfect or smooth out the output signal of the amplitude circuit 47. The output signal from amplitude circuit 47 is passed from the filter 48 to an output circuit 49 which is arranged to develop an output signal containing pulses wherein the pulse rate of the output signal is proportional to the amplitude of the peak voltage of the input signal derived from the amplitude circuit 47. The pulses of the output signal are negative relative to a reference value electrical or ground return and are conducted to the monocable conductor 44 via the primary winding 50 of transformer 51. The secondary winding 52 of transformer 51 is isolated from the electrical ground return 44a by means of a blocking capacitor 53.

From the foregoing it will be appreciated that, at a predetermined time after the acoustic impulse is emitted by the transmitter means, an electroical signal is generated by the receiver means in response to the arrival of the emitted acoustic impulse; and this signal is sensed by the amplitude circuit 47 over a predetermined time period or interval. In this way each of the successive measurements are related to one another since they are consistently sampled at like or given predetermined times after the emission of acoustic impulses and over like or given predetermined time intervals.

In accordance with the foregoing remarks, if it is desired to measure the characteristic of the signal as it initially arrives at the receiver means, the time may be calculated in a well-known manner by a consideration of the stand off distance of the transmitter means and the receiver means from the wall of the casing, the velocity of the fluids, the angle of incidence between the passage of acoustic energy when it is transmitted via the fluid into the casing, the velocity of the casing and the spacing between the Transmitter and Receiver. Thus, the stand off plugs 24 as disclosed in FIG. 3 now assume their proper significance and importance in providing a given stand off spacing of the tool from the casing so that the preselected time may be determined with a great deal of certainty. After a precise determination of the preselected time has been calculated, the delay circuit 45 may accordingly be set to operate delay gate 46 at a time related to the triggering of the transmitter T. Time gate 46 may have an operational time duration set according to a selected time period (which may be determined from the frequency of the emitted acoustic impulse) to measure only the desired portion of the signal.

For one reason or another it may be desired to change the stand off distance of the tool from the casing wall. For example, a centralizer unit 65 (FIG. 4) with circumferentially spaced, elastomer constructed arms 65' can be coupled to the apparatus to centralize the same in the casing. Moreover, the desired portion of the signal to be measured may typically arrive either before or after the actuation of time gate 46 while the apparatus is in the well bore. In either of these cases, i.e., to accommodate changes in the stand off distance as well as optimize operation of the apparatus, a switching circuit 70 (FIGS. 5 and 7) is connected to the delay circuit 45 and effectively controls the duration of the time delay occurring between the pulsing of the transmitter and the actuation of the time gate circuit 46. Specifically, the switch circuit 70 varies the time delay in circiut 45 by predetermined increments of time and is operated by a surface control signal transmitted via the monocable conductor 44 in a manner which will hereinafter be more fully explained.

Referring to FIG. 7, the switching circuit 70 for changing the time delay of delay circuit 45 is illustrated in detail. In general, the switching circuit 70 is adapted to be normally inoperative whenever the A.C. power source 43 at the earth's surface (FIG. 6) is coupled to the conductor 44 of the monocable by switch 43a; and, as explained heretofore, when the A.C. source is disconnected from the conductor 44 by switch 43a, either positive or negative voltage or control signals may be applied to the monocable to effect an operation of the switch circuit 70. In the particular arrangement hereinafter to be described, a positive D.C. signal or potential serves to step a stepping switch in the switching circuit 70 while a negative D.C. potential or signal serves to reset the aforementioned stepping switch to its starting position. The connections of the various stationary contacts of the stepping switch provide a control effect by varying the time delay characteristics of the delay circuit 45.

In the switch circuit 70, a first relay or switch 71 is arranged to be operated by virtue of an A.C. current on the monocable 14 to disconnect an input conductor 44b of the monocable conductor 44 from an input conductor 72 in the switch circuit 70. In the absence of A.C. current in the monocable 14, conductors 44b and 72 are normally connected to one another by a normal closed position of the contacts of switch 71. Switch 71 has a solenoid 72b which is electrically connected between an electrical ground and the downhole D.C. power supply 72a. The D.C. power supply 72a is coupled via a transformer 71a to cable conductor 44 so that the power from the A.C. surface supply 43 is rectified to provide a D.C. output to the solenoid 72b as well as provide D.C. outputs or biasing potentials for other downhole circuitry. Hence, when the surface A.C. power supply 43 is connected to conductor 44, solenoid 72b is energized so that switch 71 disconnects the input conductor 72 in the switch circuit 70 from the cable conductor 44b.

The delay circuit 45 may be a one shot multivibrator which is illustrated in part of the upper portion of FIG. 7 and includes a resistance 73 and capacitance 74 in a network wherein any change of capacitance in the network will alter the time delay operational characteristics of the multivibrator. As such, the capacitor 74 in the multivibrator may be selectively combined with other capacitors 74(a, b . . . k) with various selected values to selectively alter the time delay operational characteristics of the delay circuit 45. The various capacitances 74(a, b . . . k) may be coupled in parallel to the capacitance 74 by inserting the various capacitors between the respective stationary terminals of a stepping switch 76 and one terminal of the capacitor 74 and connecting the movable arm 77 of the stepping switch 76 to the remaining terminal of the capacitor 74. The solenoid 78 for operating the stepping switch 76 is coupled to the input conductor 72 via a diode 77a which is connected such that a single applied positive D.C. voltage signal applied to the input conductor 72 is conducted via a diode 77a to the solenoid 78 thereby stepping the switch through one step or one position. Hence, for each applied positive pulse the switch 76 may be stepped one position to distinctively change the time delay by a fixed preselected increment of time.

Should it be desired to reset the switch 76 at any time to the initial or "home" position illustrated in the drawings, the following system is provided. A cam 80 is mechanically coupled (as shown by dashed line 81) to the movable arm 77 of the stepping switch and controls the position of a mechanism of linkage 82 which in turn controls a relay or switch 83. Switch 83 has a movable contact coupled to the input conductor 72 which, in the initial position of the stepping switch 76 shown, couples input conductor 72 to a diode 84 and resistance 85 to electrical ground. The diode 84 is so connected that the diode 84 conducts only when the potential on conductor 72 is negative, and the resistance 85 thereupon provides an electrical load. Switch 83 in its other position connects its movable arm and, accordingly, the input conductor 72 to the movable arm of an interrupter switch 86 which in a closed position completes a circuit to the solenoid 78. Hence, the cam 80 serves to operate the relay switch 83 in a "home" position of the movable arm 77 of the stepping switch 76 to disconnect or break the electrical path from conductor 72 via the interrupter switch 86 to the solenoid 78.

From the foregoing description it will be appreciated that aytime after the cam 80 is stepped one position, the linkage 82 operates switch 83 so that input conductor 72 is connected via switch 83 and interrupter switch 86 to the solenoid 78. Thus, if it is desired to reset the switch 76 to its initial position, a negative potential can be applied to the input conductor 72 via the cable conductor 44, which negative potential causes a current flow via switch 83, interrupter switch 86 and the relay solenoid 78. Solenoid 78 is then energized to step one position, and in so doing, interrupter switch 86 is opened and closed. The opening of the interrupter switch 86 permits the solenoid 78 to be de-energized while the subsequent closing causes the cycle to repeat. Hence, the stepping switch 76 will be stepped automatically until the cam 80 actuates switch 83 to disconnect the input conductor 72 from interrupter switch 86. Switch 83 when actuated by cam 80 couples the input conductor 72 to the dummy resistance load 85 via the diode 84. Since the diode 77 in switch circuit 70 prevents further actuation of solenoid 78 of switch 76 by the negative potential, the stepping switch 76 is held in its "home" position. To prevent burning out and sparking of the contact elements of interrupter switch 86, an arc suppression network 90 may be connected across the switch 86.

It should also be appreciated that a purpose of disconnecting the solenoid 78 or dummy load 85 from the conductor 44 is to prevent shorting out of the casing collar signals and the pulse signals.

Referring now to FIG. 5, the amplitude circuit 47 which is controlled by a timed pulse output from time gate 46 includes a triode gating tube 90 with its control grid connected to time gate 46 and its plate coupled via a diode 91 to an amplifier 92 which is, in turn coupled to the receiver means 47a. The diode 91 is connected in this circuit so that voltage signals are effectively passed to ground via the low impedance path of the triode 90. Also coupled to amplifier 92 is another diode 93 which is connected to a cathode follower 94. Between the diode 93 and cathode follower 94 are a resistance 95 and capacitance 96 which are connected to ground. Diode 93 is similarly connected to pass voltage signals from amplifier 92. The electrical signals generated by the receiver means 47a in response to acoustic impulses are passed via the triode 90 to ground by diode 91 since this is a relatively low impedance path. However, when a control pulse from time gate 46 cuts off tube 90, diode 93 conducts in response to the electrical signal and capacitor 96 is charged up to the attained peak value of the applied voltage. Resistor 95 has a value to hold such an attained peak value for an adequate period of time. The resistor 95 and capacitor 96 are provided with a relatively large time constant and cathode follower 94 accordingly produces an output signal which is proportional to the peak value of the signal applied to diode 93 during the period that triode 90 is nonconducting. It has been considered preferable to measure the peak value of only half cycles of the electrical signal and, in particular, the second half of the first cycle of the signal.

The voltage output of the cathode follower 94 is filtered or smoothed out by the filter circuit 48 and passed to the output circuit 49 which is arranged to produce a pulse output having a rate proportional to the amplitude of the input signal from the cathode follower 94.

Output circuit 49 is shown in detail in FIG. 8, and in the diagram the input to output occurs from right to left. For a complete understanding, certain typical waveforms of the operating conditions at various locations in the circuit are illustrated in FIGS. 9 and 10. In the circuit, the input terminals 100 are arranged to receive the D.C. signal from low pass filter 48 which signal is applied via resistances 98 and 99 to the emitter 101 of a PNP transistor 102. A capacitor 97 is connected across the input terminals 100 to filter A.C. signal components. The collector 104 of transistor 102 is connected via a capacitor 105 to ground. The base 106 of transistor 102 is connected across a resistance load 109 coupled to an emitter 107 of a NPN transistor 108 wherein the collector 110 is connected to a regulated source of positive D.C. voltage and the base 111 is connected to a voltage dividing network comprised of resistances 112 and 113. This cascaded transistor arrangement permits the voltage drop between the emitter 101 and base 106 of transistor 102 to be balanced by the voltage drop between the base 111 and emitter 107 of the transistor 108. With the above described arrangement resistances 98 and 99 are made large compared to the input resistance at emitter 101 so that $$I_{in} = \frac{E_{in} - E_1}{R_1 + R_2} \quad (1)$$

where $E_{in}$ represents the input voltage, $I_{in}$ represents the input current, $E_1$ represents the voltage at the base of transistor 108 and $R_1$, $R_2$ represent the resistance values of resistances 98 and 99. Consequently, the current $I_c$ to the capacitor is equal to the input current $I_{in}$ times the amplification factor $\alpha$. Capacitor 105 is charged by a constant current $\alpha I_{in}$ and acquires charge, and hence voltage, at a rate proportional to $I_{in}$ and therefore proportional to $E_{in}$.

Capacitor 105 is connected to a conventional Schmitt trigger circuit 114. In the quiescent condition of circuit 114, an input NPN transistor 115 is normally at cut off or "off" while an output NPN transistor 116 is normally conducting or "on." The output conductor 116 of transistor 116 is connected to the base 118 of an amplifying transistor 119 which, in turn, has its emitter 120 connected to the base 121 of another ampifying transistor 119a. The collector 123 of transistor 119a is connected to the primary winding 50 of the output transformer 51 which has its secondary winding 52 coupled to the monocable conductor 44. Winding 50 of the transformer 51 is coupled to a D.C. positive potential source.

The output conductor 117 of the Schmitt trigger circuit 114 is also connected via a conductor 122 to the base 124 of a transistor switch 125. Transistor switch 125 has an emitter 126 connected to ground and a collector 127 coupled via a resistance 128 to the capacitor 105. Transistor switch 125 has normal operating condition at cutoff or "off."

The operation of the above-described circuit is as follows: at a given time $t_0$ (FIG. 9), the transistor 115 is off, transistor 116 is on and transistor 125 is off. With an applied $E_{in}$, the voltage $E_c$ on capacitor 105 will reach a value $E_t$ equal to the firing voltage of the transistor 115 of Schmitt trigger at a time $t_x$, which time $t_x$ is proportional to $$\frac{C}{I_c} \int dE_c \quad (2)$$

where C is the capacitance of capacitor 105. When transistor 115 "fires," or is turned on, transistor 116 is turned off and transistor switch 125 is turned on. Transistor switch 125 discharges capacitor 105 with a time constant dependent upon resistance 128 and capacitor 105, and this time constant is made short compared with the minimum period of an output pulse rate to be used. This time constant can be arranged, for example, so that 50 microseconds elapse before capacitor 105 discharges to a voltage value $E_0$. Of course, when the input voltage reaches a value of $E_0$, the transistor 115 of Schmitt trigger 114 is cut off, transistor 116 is turned on and transistor switch 125 is turned off so that the capacitor 105 commences to charge again. With the same input voltage $E_{in}$, the time in which the capacitor 105 charges up to the trigger voltage of capacitor 105 is constant and hence it will be appreciated that the spacing or repetition rate of the pulses is dependent upon the amplitude of the input voltage. This is clearly evident from a consideration of FIG. 10 which corresponds to the diagram of FIG. 9 except that a greater slope occurs in the voltage build upon capacitor 105 between times $t_a$ and $t_b$ indicating a higher input voltage $E_{in}$ which permits a faster charging of the capacitor $C_{105}$. The output pulses 130 of transistor 116 of the Schmitt trigger 114 thus have a fixed pulse width and a repetition rate dependent upon the amplitude of the input voltage. The period (T) of the output voltage of the transistor 121 is inversely proportional to the input voltage $E_{in}$, or, stated another way, the frequency of the output voltage of transistor 121 is equal to $$\frac{1}{T} \alpha E_{in} \quad (3)$$

The output signal supplied to the monocable conductor 44 may be detected in terms of the pulse rate which is proportional to the D.C. input voltage $E_{in}$ or the output signal can be translated to a D.C. output signal inversely proportional to the input voltage $E_{in}$.

Returning now briefly to FIG. 5, the gamma ray detector means may consist, for example, of a conventional scintillation counter 140 which detects the existing level of radioactivity and provides an output to a conventional discriminator circuit 141. A conventional scaler circuit 142 may be inserted between the discriminator circuit 141 and a conventional blocking oscillator output circuit 143 to conform the output of the discriminator circuit 141 to a more convenient form for cable transmission. The output of the blocking oscillator circuit 143 is coupled via a transformer 144 to the monocable conductor 44. The output of the gamma ray detector means is typically an output of positive pulses wherein the repetition rate of the pulses provides an indication of the intensity of the radiation.

The conventional casing collar locater 150 as illustrated is connected via a conventional amplifier 151 to the monocable and provides typically a D.C. signal whose amplitude varies at a low frequency rate in response to the detecting coil of the collar locater 150 traversing a jointed connection in the pipe string. To prevent shorting out the low frequency casing collar signal, blocking capacitors 53, 152 and 152a (FIG. 5) are inserted between the conductor 44 of the monocable and the ground return.

As shown in FIG. 6, at the surface of the earth there are essentially three signals which may be arriving either simultaneously or independently relative to one another. These signals are the D.C. casing collar signal, the positive pulses from the gamma ray signals, and the negative pulses of the acoustic logging apparatus. A conventional galvanometer in a recorder 155 at the earth's surface is made responsive to the casing collar signals to the exclusion of the pulses from the gamma ray and acoustic circuit by suitable filtering so that the signals indicative of the occurrence of casing collars may be recorded on the Casing Collar Log developed by the recorder. The positive and negative pulses of the radioactivity and acoustic circuits in the down hole apparatus are supplied to a filter circuit 160 wherein the secondary winding 161 of the transformer 12 has its end terminals 161a, 161b respectively coupled to conventional detector circuit 162a, 162b. One of the detector circuits 162a is arranged to be responsive to only positive pulses while the other detector circuit 162b is arranged to be responsive only to negative pulses. The pulse generators 163a and 163b serve to reshape the pulses at the outputs of the detectors 162a and 162, respectively.

The output of detector 162a is coupled to the pulse generator 163a and also to a gate circuit 164a. The gate circuit 164a is arranged to be responsive to an output of detector 162a to turn off detector 162b for a given period of time. Hence, if a positive pulse is detected first by the detector 162a, the gate 164a would turn off the detector 162b for a given time interval. The output of the pulse generator 163a is supplied to a counter circuit 165a which produces an output voltage representative of the number of pulses per second which output voltage is supplied to the recorder 155. The output of detector 162b is similarly coupled to the pulse generator 163b and also to a gate circuit 164b. The gate circuit 164b is arranged to be responsive to the output of detector 162b to turn off the other detector 162a for a given period of time. Hence, if a negative pulse is detected first by the detector 162b, the gate 164b would turn off the detector 162a for a given time interval. The output of the pulse generator 163b is supplied to the counter circuit 165b which produces an output voltage representative of the number of pulses per second which output voltage is supplied to the recorder 155.

The operation of the apparatus from the foregoing detailed description may be readily appreciated; and, therefore, only a brief description hereafter is provided by way of summary of the more pertinent aspects of the present disclosed invention. In operation the apparatus 10 is lowered in the usual manner to the lowermost depth from which the logging operation is commenced. Thereafter, at this depth the switch 43a at the surface is connected to the A.C. power source 43 so that the signals are sent down the cable conductor 44; and the keyer means 41 periodically pulses the transmitter to emit time spaced acoustic impulses. Since the stand off device on the apparatus physically spaces the apparatus a given distance from the wall of the casing, the time of arrival of an emitted acoustic impulse at the receiver means 47a can be calculated. Since the emitted acoustic impulse normally consists of a number of cycles of undulating pressure waves, the receiver means 47a will respond to the pressure waves to produce a corresponding electrical signal. In accordance with a preferred operation of the present invention, it is desired to measure only a single pressure peak which, of course, corresponds to single peak of the electrical signal. The pressure peak to be measured is preferably the second peak of the first cycle of an acoustic impulse to arrive at the receiver means 47a. Because the time at which such a second peak will arrive at the receiver means 47a can be precisely calculated, the amplitude circuit means 47 is actuated at a predetermined time after emission of an acoustic impulse for a predetermined time interval. The timing function for circuit means 47 is accomplished by a delay means 45 and time gate 46 which are connected between the transmitter means and the amplitude circuit 47 which is connected to the receiver means. The amplitude of the electrical signal thus sensed by amplitude circuit means 47 is converted into a pulse output by output circuit 49 which pulse output has a relatively negative polarity with respect to a reference level and which pulse output has a repetition rate dependent upon the amplitude of the peak of the signal which was sensed. The negative pulses are passed up cable conductor 44 to trigger a detector 162b (FIG. 6) which promptly switches off a positive pulse channel detector 162a and counts the number of pulses and applies a signal to the recorder 155 indicative of the amplitude of the signal detected in the bore hole by the receiver means 47a. From experience it will generally be known what the amplitude of the signal should be in a casing in which the cement is properly bonded thereto; and while the apparatus is thus resting in the lowermost position of the borehole, such an indication should substantially be reproduced by the recorder.

If, however, the amplitude indication initially obtained is not precisely the indication which might be expected, the accuracy of the reading may be checked by changing the predetermined time delay in the following manner: Switch 43a is moved to disconnect the A.C. power source 43 from the cable conductor 44 which immediately disconnects the transmitter means 41a and the power supply 72a in the borehole apparatus and accordingly discontinues the supply of downhole output potentials from the power supply 72a. Thus, the solenoid 72b of the switch 70 in the borehole apparatus (which is connected to the output of the power supply 72) is de-energized to permit the switch 71 to assume the position shown in FIG. 7 connecting the cable conductor lead 44b to the input conductor 72 in the switch 70. Now switch 43a at the surface may be moved to connect the source of potential B+ to the cable conductor 44 at which time a control signal passes down the cable conductor 44 via the switch 71 and diode 77a to actuate a solenoid 78 to step the stepping switch 76 one position. In the "home" position shown in the drawings, a cam 80 simultaneously moved with the movable arm 77 of switch 76 connects the input conductor 72 via a switch 83 and an interrupter switch 86 to the solenoid 78. The stepping of the switch 76 effectively changes the capacitance in a one-shot multivibrator delay circuit 45 so that the predetermined time at which the time gate 46 is actuated has been changed by an incremental period of time. Next, the A.C. power source 43 can again be connected to the cable conductor 44 to operate the transmitter means 41a and the downhole power supply 72a is again actuated to operate solenoid 72b to disconnect, by means of switch 77, the switching circuit 70 from the cable conductor 44. With the transmitter means 41a again emitting impulses, the recorder will as previously described produce an indication of the amplitude signal obtained at the predetermined time and during the predetermined time after the emission of each pulse. The above-described operation may be repeated by disconnecting the power supply 43 and applying a positive control signal at the surface to move the stepping switch to another position. At any time, should it be desired to return the stepping switch to its initial or "home" position, the switch 43a at the surface may be connected to a negative source of potential and this control signal passed via cable conductor 44, the switch 71 and switches 83 and 86 to the solenoid 78. The stepping switch 76 will be continuously actuated as long as the negative source of potential is applied by virtue of the interrupter switch 86 continuously providing the interruption necessary to energize and deenergize solenoid 78 and step the switch. At the time the movable arm 77 of the stepping switch 76 approaches its "home" position, the cam 80 actuates a linkage 82 to disconnect the circuit through the interrupter switch 86 by opening the switch 83 and connecting the negative source of potential to a dummy load 85 in the switch circuit. Switch 83 when open disconnects the solenoid 78 from being operated by the negative potential signal and the switch thus stops in the "home" position. It will be appreciated that although a stepping switch and solenoid are specifically disclosed as operated by the switch 71, the principle involved in the surface control of switch 71 by the circuit 72a is applicable to any type of downhole circuit means which may be substituted for the stepping switch and solenoid 78 and selectively operated by a signal which does not actuate circuit 72a.

At the same time that the acoustic probing means above described are probing the material surrounding the well bore with the acoustic impulses and providing a pulse output with a given polarity to the common cable conductor 44, a scintillation counter 140 which detects radioactivity in the adjacent surrounding media provides a pulse output which is positive with respect to a reference value. The pulse output of the radioactivity means is also applied to the common cable conductor. Hence, both positive and negative pulses with respect to a common reference value are supplied to a common cable conductor. Also imposed upon the common cable conductor are casing collar signals which occur only when the device traverse a jointed section between the casing where the changes in the ferromagnetic configuration of the pipe string causes the casing collar locator to produce a low frequency output signal which is also supplied to the common cable conductor 44. At the earth's surface (FIG. 6) the outputs are individually used to develop the individual log presentations as illustrated in FIG. 2.

As shown in FIG. 8 the amplitude to pulse converter uses a well-known Schmitt trigger circuit 114 in a unique arrangement to provide relatively small time duration pulses, i.e., about 50 microseconds with a repetition rate dependent upon the input amplitude. In this arrangement a constant current source is used to charge a capacitor which thereby provides the signal for triggering the Schmitt circuit. A transistor switch is connected to a resistance discharge path and operated upon the triggering of the Schmitt circuit to rapidly discharge the capacitor to turn the Schmitt circuit off again.

The foregoing described features are illustrative of a unique system of acoustic logging both singly and in combination with other systems to provide output pulses suitable for single conductor transmission, unique systems of controlling downhole circuit systems coupled to a single conductor, and unique systems of developing output pulses with a repetition rate dependent upon input amplitudes.

What is claimed is:

1. A logging system comprising an exploratory probe arranged for passage through a well bore, acoustic logging means carried thereby including transmitter means and at least one receiver means jointly operable to probe the material surrounding the well bore with acoustic impulses, means for obtaining electrical signals representative of amplitude characteristics of the acoustic impulses intercepted by said receiver means, means coupled between said transmitter and receiver means for restricting the passage to a cable conductor of an electrical impulse corresponding to an acoustic impulse intercepted by said receiver means to a predetermined time interval after its emission by said transmitter means, and surface controlled means coupled to said restricting means for changing said predetermined time interval, said surface controlled means including switch means and circuit means arranged for connection with said cable conductor, said circuit means being responsive to signals on said cable conductor for developing first output signals, said switch means being coupled to said circuit means and responsive to first output signals of said circuit means for operatively disconnecting said switch means from said cable conductor.

2. A logging system comprising: an exploratory probe arranged for passage through a well bore including acoustic logging means having a transmitter means and at least one receiver means conjointly operable to probe the materials surrounding the well bore with acoustic impulses and develop electrical signals representative of the interception of an acoustic impulse by the receiver means; pulse generating circuit means having an input coupled to said receiver means and operable to develop a pulse output representative of said electrical signals; current storage means coupled to said input of said circuit means to provide an input trigger signal thereto upon charging up to a predetermined value; discharge means coupled to said current storage means and responsive to a pulse output signal from said circuit means to discharge said current storage means; and means coupled between said transmitter means and said receiver means for restricting the measurement of an electrical signal to a given time interval at a predetermined time after emission of each acoustic impulse from the transmitter means.

3. A logging system comprising: an exploratory probe arranged for passage through a well bore including acoustic logging means having a transmitter means and at least one receiver means conjointly operable to probe the materials surrounding the well bore with acoustic impulses and develop electrical signals representative of the interception of an acoustic impulse by the receiver means, circuit means having an input coupled to said receiver means and operable to develop a pulse output in response to electrical signals; current storage means coupled to said input of said circuit means to provide an input trigger signal upon charging up to a predetermined value; selectively operable discharge means coupled to said current storage means and responsive to a pulse output signal from said circuit means to discharge said current storage means; means coupled between said transmitter means and said receiver means for restricting the measurement of an electrical signal to a given time interval at a predetermined time after emission of each acoustic impulse from the transmitter means; and surface controlled means coupled to said restricting means for selectively changing said predetermined time by given increments of time.

4. A logging system comprising: an exploratory probe arranged for passage through a well bore at the end of a cable including acoustic logging means having a transmitter means and at least one receiver means conjointly operable to probe the materials surrounding the well bore with acoustic impulses and develop electrical signals representative of the interception of an acoustic impulse by the receiver means, first circuit means having an input coupled to said receiver means and operable to develop a pulse output in response to electrical signals; current storage means coupled to said input of said first circuit means to provide an input trigger signal upon charging up to a predetermined value; selectively operable discharge means coupled to said current storage means and responsive to a pulse output signal from said first circuit means to discharge said current storage means; means coupled between said transmitter means and said receiver means for restricting the measurement of an electrical signal to a given time interval at a predetermined time after emission of each acoustic impulse from the transmitter means; means coupled to said restricting means for selectively changing said predetermined time by given increments of time, said changing means being responsive to surface generated control signals carried via a cable conductor, switch means connected to the input of said changing means and arranged for connection to a cable conductor, second circuit means arranged for connection with a cable conductor, said second circuit means being responsive to signals on a cable conductor for developing first output signals, said switch means being coupled to said second circuit means and responsive to first output signals of said second circuit means for operatively disconnecting said changing means from a cable conductor.

5. A logging system comprising an exploratory probe arranged for passage through a well bore, means carried by said probe for detecting radiation entering the well bore and developing corresponding pulses of a given polarity relative to a reference level to provide a first pulse output representative of the radiation intensity, and acoustic logging means carried by said probe including transmitter means and at least one receiver means operable to probe the material surrounding the well bore with acoustic impulses and to develop electric pulses of a polarity opposite to said given polarity relative to said reference level in response to the arrival of acoustic impulses at said receiver means to provide a second pulse output, a cable supporting said probe and providing a common transmission channel to the surface for said first and second pulse outputs and for supplying a D.C. control signal from the surface to said probe, said acoustic logging means including means coupled between said transmitter and receiver means for restricting the internal of time following emission of an acoustic impulse by said transmitter means during which said electric pulses are developed in correspondence with acoustic impulses intercepted by said receiver means, surface controlled means for changing said time interval including switch means coupled to said restricting means and circuit means arranged for connection with said cable, said circuit means being responsive to the D.C. level of said control signal for developing first output signals, said switch means being coupled to said circuit means and responsive to said first output signals for operatively disconnecting said switch means from said cable, and means at the surface coupled to said common transmission channel and successively responsive to said pulse outputs to provide output indications of both said radiation intensity and the response of the materials surrounding the well bore to acoustic impulses.

6. A logging system comprising: an exploratory probe arranged for passage through a well bore and including radiation logging means operable to detect natural radioactivity occurring in the materials surrounding the well bore and develop a first pulse output representative of the intensity of the radiation, acoustic logging means including transmitter means and at least one receiver means operable to probe the materials surrounding the well bore with acoustic impulses and develop a second pulse output representative of the acoustic parameters as determined from the acoustic impulses, said first and second pulse outputs being of different polarity relative to a reference value for transmission along a common electrical conductor path, said acoustic logging means including means coupled to said transmitter means for periodically actuating said transmitter means, amplitude sensitive means coupled to said receiver means, delay means and time gate means coupled between said actuating means and said amplitude sensitive means for operating said amplitude sensitve means for a predetermined time interval at a predetermined time after actuation of said transmitter means, output circuit means coupled to said amplitude sensitive means responsive to the output of said amplitude sensitive means for developing said second pulse output having pulses with a repetition rate proportional to the magnitude of the output from said amplitude sensitive means, and means at the surface coupled to said common electrical conductor path and successively responsive to said pulse outputs to provide output indications of both said radiation intensity and said acoustic parameters.

7. A logging system comprising: an exploratory probe arranged for passage through a well bore and including radiation detection means operable to detect natural radio-activity occurring in the materials surrounding the well bore and develop a first pulse output representative of the intensity of the radiation, acoustic logging means including transmitter means and at least one receiver means operable to probe the materials surrounding the well bore with acoustic impulses and develop a second pulse output representative of the acoustic parameters as determined from the acoustic impulses, said first and second pulse outputs being of different polarity relative to a reference value for transmission along a common electrical conductor path, said acoustic logging means including means coupled to said transmitter means for periodically actuating said transmitter means, amplitude sensitive means coupled to said receiver means, delay means and time gate means coupled between said actuating means and said amplitude sensitive means for operating said amplitude sensitive means for a predetermined time interval at a predetermined time after actuation of said transmitter means, means coupled to said delay means for selectively changing said predetermined time, output circuit means coupled to said amplitude sensitive means responsive to the output of said amplitude sensitive means for developing said second pulse output having pulses with a repetition rate proportional to the magnitude of the output from said amplitude sensitive means, and means at the surface coupled to said common electrical conductor path and successively responsive to said pulse outputs to provide output indications of both said radiation intensity and said acoustic parameters.

8. A logging system comprising: an exploratory probe arranged for passage through a well bore and including radiation logging means operable to detect natural radioactivity occurring in the materials surrounding the well bore and develop a first pulse output representative of the intensity of the radiation, acoustic logging means including transmitter means and at least one receiver means operable to probe the materials surrounding the well bore with acoustic impulses and develop a second pulse output representative of the acoustic parameters as determined from the acoustic impulses, said first and second pulse outputs being of different polarity relative to a reference value for transmission along a common electrical conductor path, said acoustic logging means including means coupled to said transmitting means for periodically actuating said transmitter means, amplitude sensitive means coupled to said receiver means, delay means and time gate means coupled between said actuating means and said amplitude sensitive means for operating said amplitude sensitive means for a predetermined time interval at a predetermined time after actuation of said transmitter means, means coupled to said delay means for selectively changing said predetermined time, said selectively changing means being operative in response to electrical signals on the common electrical conductor path to effect incremental changes in said predetermined time, output circuit means coupled to said amplitude sensitive means responsive to the output of said amplitude sensitive means for developing said second pulse output having pulses with a repetition rate proportional to the magnitude of the output from said amplitude sensitive means, and means at the surface coupled to said common electrical conductor path and successively responsive to said pulse outputs to provide output indications of both said radiation intensity and said acoustic parameters.

9. A logging system comprising: an exploratory probe arranged for passage through a well bore by means of a monocable and including radiation logging means operable to detect natural radioactivity occurring in the materials surrounding the well bore and develop a first pulse output representative of the intensity of the radiation, acoustic logging means including transmitter means and at least one receiver means operable to probe the materials surrounding the well bore with acoustic impulses and develop a second pulse output representative of the acoustic parameters as determined from the acoustic impulses, said first and second pulse outputs being of different polarity relative to a reference value for transmission along a common electrical conductor path of the monocable, said acoustic logging means including means coupled to said transmitter means for periodically actuating said transmitter means, amplitude sensitive means coupled to said receiver means, delay means and time gate means coupled between said actuating means and said amplitude sensitive means for operating said amplitude sensitive means for a predetermined time interval at a predetermined time after actuation of said transmitter means, means coupled to said delay means for selectively changing said predetermined time, said selectively changing means being operable in response to electrical signals on the common conductor path to effect incremental changes in said predetermined time, output circuit means coupled to said amplitude sensitive means responsive to the output of said amplitude sensitive means for developing said second pulse output having pulses with a repetition rate proportional to the magnitude of the output from said amplitude sensitive means; surface indicating means coupled to said monocable and successively responsive to said pulse outputs to develop indications of the intensity of radiation and amplitude of the detected impluse, and surface control means for rendering inoperative said periodically actuating means and providing a control signal to said selective change means.

10. A logging system comprising: an exploratory probe suspended by means of a monocable and arranged for passage through a well bore including acoustic logging means having a transmitter means and at least one receiver means conjointly operable to probe the materials surrounding the well bore with acoustic impulses, said logging means being operable for developing pulse outputs representative of measurements of acoustic impulses, means coupled between said transmitter and receiver means for restricting the measurement of an acoustic impulse intercepted by the receiver means to a given interval at a predetermined time after emission of each impulse from the transmitter means, means for selectively applying D.C. and A.C. control signals to said monocable, and a switching circuit coupled to said restricting means for selectively changing said predetermined time by given increments, said switching circuit being responsive to D.C. control signals on the monocable for developing a control function including a solenoid operated stepping switch, a reset switch and an interrupter switch connected in series, and a diode connected between the input of the reset switch and solenoid to bypass said switches while a signal with a given polarity is applied to the switching circuit; switch means connected to the input of said switching circuit to the monocable; rectifier means responsive to an A.C. signal on the monocable for developing a D.C. output potential; said switch means being coupled to said rectifier means and responsive to a D.C. output potential to decouple said switching circuit from the monocable.

11. A logging system for use in a cased bore hole in which the casing is at least partially surrounded by a cement sheath, said system comprising:
  a logging tool adapted to be moved through said borehole;
  a sheathed cable supporting said tool;
  a single insulated electrical conductor in said cable;
  surface equipment including signal receiving means;
  a direct current supply electrically connected to said conductor;
  an electrically actuated acoustic shock wave transmitter in said tool, said transmitter electrically connected to said conductor and adapted to produce acoustic shock waves for transmission axially of said borehole;
  an acoustic shock wave receiver in said tool spaced from said transmitter including means for converting received acoustic energy into an intermediate electrical signal made up of a series of pulses of varying amplitude;
  amplitude responsive means electrically connected to said receiver in said tool for producing a direct current voltage output of magnitude proportional to the amplitude of pulses of said intermediate signal received by said amplitude responsive means;
  a pulse generator electrically connected to the output of said amplitude responsive means for producing an acoustic logging as a series of direct current voltage pulses of one polarity and of a frequency proportional to said voltage output of said amplitude responsive means;
  means electrically connecting the output of said pulse generator to said conductor;
  radioactivity detector means in said tool for receiving radiation from earth formations traversed by said borehole, said radioactivity detector means effective to convert said received radiation into a radioactivity logging signal made up of a series of direct current voltage pulses of polarity opposite that of said acoustic logging signal;
  means electrically connecting the electrical output of said radioactivity detector means to said conductor;
  gating means electrically connected to said amplitude responsive means and effective to permit reception of only selected pulses of said intermediate signal by said amplitude responsive means; and
  means electrically interconnected with said shock wave transmitter and said gating means and actuated by said shock wave transmitter to actuate said gating means.

12. A logging system for use in a cased borehole in which the casing is at least partially surrounded by a cement sheath, said system comprising:
  a logging tool adapted to be moved through said borehole;
  a sheathed cable supporting said tool;
  a single insulated electrical conductor in said cable;
  surface equipment including signal receiving means;
  a direct current power supply, electrically connected to said conductor;
  an electrically actuated acoustic shock wave transmitter in said tool, said transmitter electrically connected to said conductor and adapted to produce acoustic shock waves for transmission axially of said borehole;
  an acoustic shock wave receiver in said tool spaced from said transmitter including means for converting received acoustic energy into an intermediate electrical signal made up of a series of pulses of varying amplitude with the amplitude of the initial pulse of said series indicative of the tightness of bonding of said cement sheath to said casing;
  amplitude responsive means electrically connected to said receiver in said tool for producing a direct current voltage output of magnitude proportional to the amplitude of said initial pulse;
  a pulse generator electrically connected to the output of said amplitude responsive means for producing an acoustic logging signal as a series of direct current voltage pulses of one polarity and of a frequency proportional to said voltage output of said amplitude responsive means;
  means electrically connecting the output of said pulse generator to said conductor;
  radioactivity detector means in said tool for receiving radiation from earth formations traversed by said borehole, said radioactivity detector means effective to convert said received radiation into a radioactivity logging signal made up of a series of direct current voltage pulses of polarity opposite that of said acoustic logging signal;
  means electrically connecting the electrical output of said radioactivity detector means to said conductor;
  gating means electrically connected to said amplitude responsive means and effective to permit reception of only said initial pulse of said intermediate signal by said amplitude responsive means; and
  means electrically interconnected with said shock wave transmitter and said gating means and actuated by said shock wave transmitter to actuate said gating means.

13. A method of simultaneously making an acoustic log and a radioactivity log in which a logging tool moved through a borehole is supported on a sheathed cable containing a single insulated conductor, such method comprising:
  periodically transmitting acoustic shock waves axially of said borehole;
  detecting radiation emitted from formations adjacent said tool, and producing a radioactivity logging signal made up of direct current voltage pulses of a selected polarity, the frequency of said pulses being a measure of said radiation;
  transmitting said radioactivity logging signal through said conductor;
  receiving said acoustic shock waves transmitted axially of said borehole;
  converting said shock waves to an intermediate electrical signal made up of a series of pulses of varying amplitude;
  converting said intermediate signal to an acoustic logging signal made up of direct current voltage pulses of polarity opposite that of said radioactivity logging signal and of a frequency proportional to the average amplitude of a selected portion of said intermediate signal; and transmitting said acoustic logging signal through said conductor simultaneously with said radioactivity logging signal.

14. The method according to claim 13 wherein said selected portion is the initial pulse of said intermediate signal.

15. A method of simultaneously making an acoustic cement bond log and a radioactivity log in which a logging tool moved through a cased borehole is supported on a sheathed cable containing a single insulated conductor and in which the casing in the borehole is at least partially surrounded by cement, such method comprising:

periodically producing and transmitting acoustic shock waves axially of said borehole;

continuously detecting radiation emitted from formations adjacent said tool, and continuously producing a radioactivity logging signal made up of direct current voltage pulses of a selected polarity, the frequency of said pulses being a measure of said radiation;

transmitting said radioactivity logging signal through said conductor;

receiving said acoustic shock waves transmitted axially of said borehole;

converting said shock waves to an intermediate electrical signal made up of a series of pulses of varying amplitude;

converting a selected portion of said intermediate signal to a direct current voltage actuating signal having an amplitude proportional to the average amplitude of the pulses of said selected portion of said intermediate signal;

actuating a pulse generator with said actuating signal to produce an acoustic logging signal made up of direct current voltage pulses of polarity opposite that of said radioactivity logging signal and of a frequency proportional to the amplitude of said actuating signal; and transmitting said acoustic logging signal through said conductor simultaneously with said radioactivity logging signal.

16. The method according to claim 15 wherein said selected portion of said intermediate signal is the initial pulse thereof.

17. A well logging system comprising a subsurface logging instrument, surface recording equipment, and a sheathed cable interconnecting said instrument and said recording equipment;

said instrument including in combination;

a radiation detector providing electrical pulses of a first polarity in response to incident radiations;

an acoustic energy transmitter producing an acoustic impulse;

an acoustic energy receiver for receiving said acoustic impulse and in response thereto developing an electrical data pulse having an amplitude which is characteristic of the amplitude of a preselected initial portion of said received acoustic impulse; and conversion means connected to said acoustic energy receiver for receiving said electrical data pulse and in response thereto producing index pulses of a second polarity at a frequency functionally related to the amplitude of said electrical data pulse;

said cable including one conductor connecting said radiation detector and said conversion means to said surface recording equipment; and said surface recording equipment including means responsive to the frequency of said index pulses for indicating the amplitude of said portion of said received acoustic impulse.

18. A well logging system comprising a subsurface logging instrument, surface recording equipment, and a shielded cable interconnecting said instrument and said recording equipment; said instrument including in combination;

a radiation detector providing in response to incident radiations electrical pulses of a first polarity;

an acoustic energy transmitter for producing an acoustic energy impulse;

an acoustic energy receiver for receiving said acoustic energy impulse and in response thereto developing an electric data pulse functionally related in amplitude to a preselected characteristic of a preselected portion of said received acoustic energy impulse; and conversion means connected to said acoustic energy receiver for receiving said data pulse and in response thereto producing index pulses of a second polarity at a frequency functionally related to said preselected characteristic;

said cable including one conductor connecting said radiation detector and said conversion means to said surface recording means; and said surface recording equipment including means responsive to said index pulses for indicating said preselected characteristic of said portion of said received acoustic impulse.

References Cited

UNITED STATES PATENTS

| | | | |
|---|---|---|---|
| 2,313,384 | 3/1943 | Lee | 73—152 |
| 2,412,575 | 12/1946 | Frosch | 73—152 |
| 969,345 | 12/1910 | Culver | 307—143 |
| 1,921,728 | 8/1933 | Champlin | 307—143 |
| 2,814,736 | 11/1957 | Hamilton | 307—88.5 |
| 2,837,663 | 6/1958 | Walz | 307—88.5 |
| 2,768,701 | 10/1956 | Summers | 340—18 XR |
| 2,974,303 | 3/1961 | Dixon | 73—152 XR |
| 3,050,150 | 8/1962 | Tixier | 181—0.5 |
| 2,604,181 | 7/1952 | Basham | 181—0.5 |
| 2,971,372 | 2/1961 | Lewis et al. | 73—67.5 |
| 3,019,414 | 1/1962 | Peterson | 181—0.5 XR |
| 3,170,136 | 2/1965 | Howes | 181—0.5 XR |
| 3,186,223 | 6/1965 | Wilson | 340—18 XR |

RICHARD C. QUEISSER, Primary Examiner

J. P. BEAUCHAMP, Assistant Examiner

U.S. Cl. X.R.

181—0.5; 340—18